9886X
C. McGregory,
Dressing Stares.
Patented July 2, 1836.
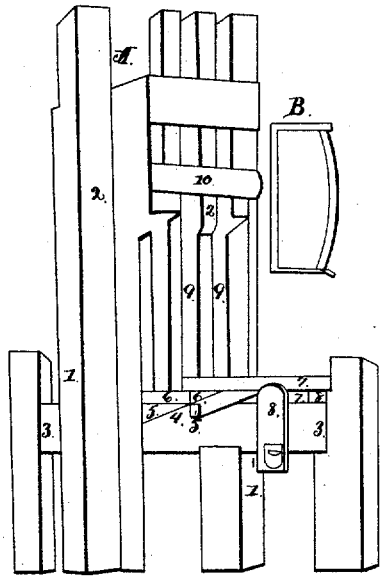
AM. PHOTO-LITHO. CO. N.Y. (OSBORNE'S PROCESS)

9886 X

Cyrus McGregory of Newport State of New Hampshire

Letters Patent.

The schedule referred to in these Letters Patent and making
part of the same, containing a description in the words of the
said Cyrus McGregory himself of his improvement in the
mode of making or manufacturing Staves for Barrels.
To all persons to whom these presents shall come.
Cyrus McGregory of Newport in the County of Sullivan
and State of New Hampshire, send Greeting —
Be it known that I the said Cyrus McGregory, have
invented, constructed, made and applied to use a new and use
ful improvement in the mode of making or manufacturing
Staves for Barrels, Hogsheads and any other casks, called the
water power Stave Dresser specified in the words following (viz)
This improvement consists in the application of per-
pendicular & horizontal guides & springs to said horizontal guides as
more fully explained in the following described machine for dressing
or dressing Staves. Two knives are fixed lengthwise in a horizontal
beam, parallel to each other, so far apart as to admit a stave of
the thickness which is desired, between their edges, and as long or
longer than the width of the stave which opening must be continued
or cut or mortised down through the said beam to let the stave
freely pass after it has passed between said knives. The beam
is to be firmly fixed to stand on feet at each end or framed into
the building where the machine is set up, of sufficient height
from the floor for the stave to fall out and be picked up. The
[illegible] [illegible] [illegible] height from six to ten feet more
or less [illegible] beam [illegible] [illegible] a frame similar to the common
[illegible] [illegible] [illegible] to be so placed that the tops of the driving
frame [illegible] [illegible] [illegible] with horizontal guides
[illegible] [illegible] [illegible] the driving frame is made to
play — play up and down in a fixed frame, similar to the frame of the saw, in a
common Saw Mill, and may be put in motion by water, steam, horse,
or any other power, in the same manner as the saw in a common saw
Mill, The upper part of the driving frame is made strong and firm so
as to be of sufficient strength to drive the stave down between
said knives through said beam, At each end of the knives there are
fixed two cross bars across said horizontal beam, one at each end of
said knives about half a foot square or may be more or less and across
these two first mentioned cross bars, on the top of them two others
are fixed lengthwise of said beam parallel with each other and
far enough apart to admit the two horizontal guides hereafter des
cribed to lie side by side between them and also admit the stave
to pass between them with said dressing knives entered between said
upper cross bars, — The two horizontal guides from three to
six inches in diameter more or less, and generally as long as
the said horizontal beam, are placed over the horizontal
between said upper cross bars, laying on said lower cross
bars and supported by them and going in the posts at the
end or by other cross bars so that they may press out upon
the springs by the side when the machine is in operation, there
are four springs of wood, steel, iron or other elastic materials
of sufficient strength two on each side of said horizontal beam
a little way from the ends of said horizontal guides, to keep them
from pressing out too far and to make them press upon said guides
the stave when it is drove these guides are best to be round
but may be of other figure or shape, —

The two perpendicular guides are fixed & fastened to
the two aforesaid upper cross bars, one on each side of the two
knives for dressing the stave — stand parallel and perpendicular
with an opening between them sufficient to receive the stave which
it is intended to dress, — These perpendicular guides must pass
up through the top of the driving frame through a groove or
other opening [illegible] made for them so that when the machine

[illegible] they are [illegible] through the top, the bottoms of each guide
remaining fixed [illegible] the two upper cross bars —
Also by a model deposited in the Patent Office of the United
States a drawing of which is herewith annexed in which Fig 1 repre-
sents the fixed frame, Fig. 2. the driving frame Fig. 3 the [illegible]
tal beam which passes through the driving frame and fixed to it,
Fig 4. Represents the [illegible] or [illegible] off of the beam below
the knives each corner of which is chamfered off that while the
stave is driven through the beam the shaving & splinters may
fly off at the out side — Fig 5 Represents under cross bars,
Fig 6. Represents upper cross bars. Fig 7. Represents horizontal
guides, Fig 8 springs to horizontal guides three [illegible] other one
being in shade of frame are not here represented Fig 9. The upright
guides Fig 10 the cross part of driving frame is held in place
and steady upright guides This improvement then con-
sists in the construction and application of the horizontal guides &
springs to them, and of the said upright guides (knives having
been heretofore fixed in a beam for dressing staves) to guide, keep
in place, steady the staves and them from breaking when driven
In testimony that the foregoing is a true specification
of my said improvement as above described I have hereunto set
my hand this fourteenth day of December A.D. 1833 —

Witness
Amasa Eddy
Samuel C. Loveland
Cyrus McGregory

Ex
C.

1028 [illegible]

Drawing